No. 715,829. Patented Dec. 16, 1902.
J. E. MANLOVE.
ANIMAL TRAP.
(Application filed Jan. 2, 1902.)
(No Model.)

Witnesses
J. E. Manlove, Inventor
by C. A. Snow & Co.
Attorneys

THE NORRIS PETERS CO., PHOTO-LITHO., WASHINGTON, D. C.

UNITED STATES PATENT OFFICE.

JOSEPH EMBERY MANLOVE, OF BUSHNELL, ILLINOIS.

ANIMAL-TRAP.

SPECIFICATION forming part of Letters Patent No. 715,829, dated December 16, 1902.

Application filed January 2, 1902. Serial No. 88,202. (No model.)

*To all whom it may concern:*

Be it known that I, JOSEPH EMBERY MANLOVE, a citizen of the United States, residing at Bushnell, in the county of McDonough and State of Illinois, have invented a new and useful Animal-Trap, of which the following is a specification.

The invention relates to improvements in animal-traps.

The object of the present invention is to improve the construction of animal-traps and to provide a simple, inexpensive, and efficient one of great strength and durability adapted when sprung to form a lock, whereby the captured animal will be securely held in it.

A further object of the invention is to provide a trap of this character in which the body of the trap will form a cover for protecting the bait from the weather.

The invention consists in the construction and novel combination and arrangement of parts hereinafter fully described, illustrated in the accompanying drawings, and pointed out in the claims hereto appended.

Figure 1:
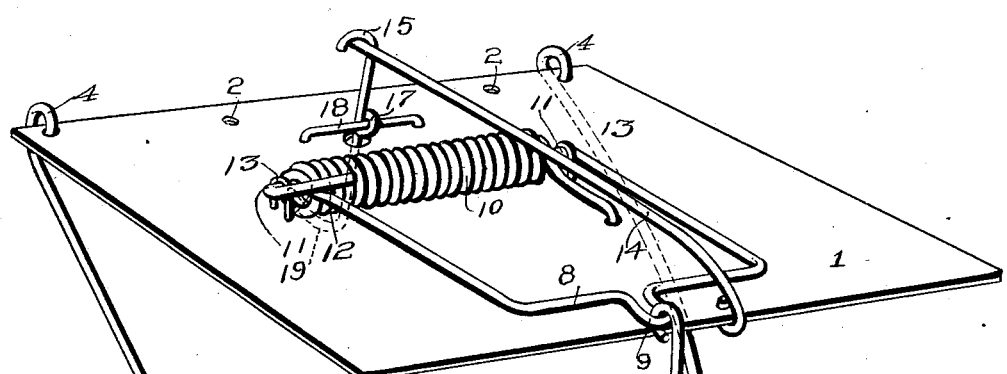
Figure 2:
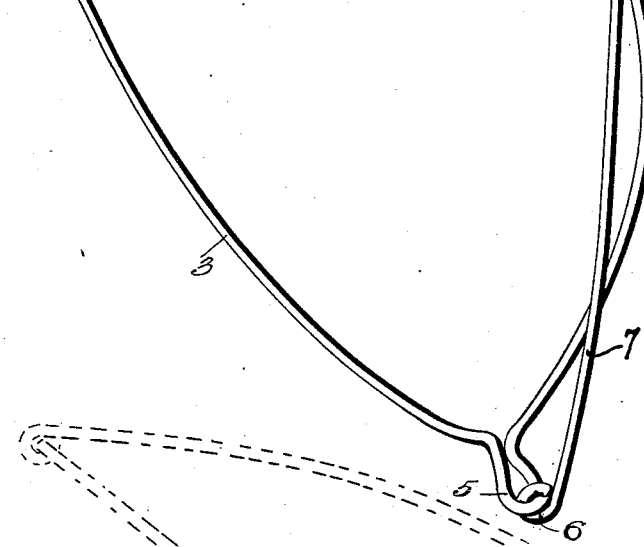
Figure 2:
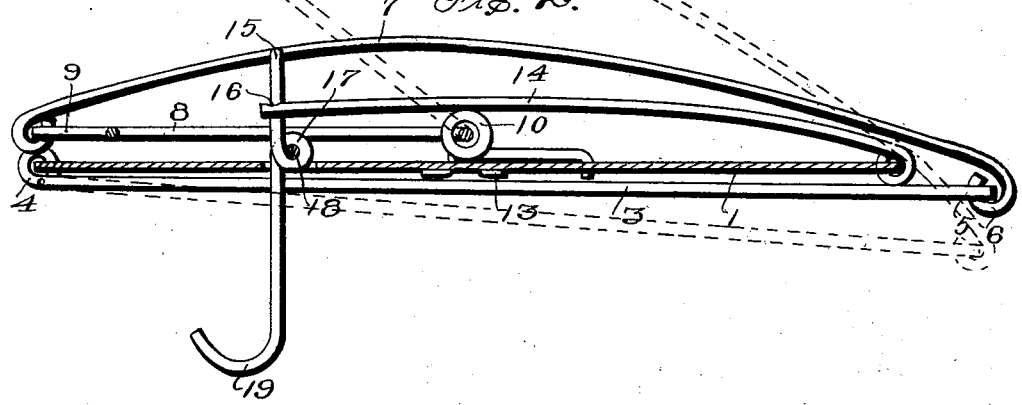

In the drawings, Figure 1 is a perspective view of a trap constructed in accordance with this invention and shown set. Fig. 2 is a sectional view illustrating in full lines the arrangement of the parts when the trap is sprung and showing in dotted lines the manner in which the parts form a lock to prevent the hinged frame from being swung away from the plate or body.

Like numerals of reference designate corresponding parts in both figures of the drawings.

1 designates a rectangular plate forming the body of the trap and provided with suitable apertures 2, adapted to receive suitable fastening devices for securing the trap to a tree, log, or other suitable support. Arranged on the lower face of the plate is a hinged frame or member 3, approximately U-shaped and provided at the terminals of its sides with eyes 4, which are linked into perforations of the plate at one edge thereof, whereby it is hinged to the same and is adapted to be arranged in the position shown in Fig. 1 of the drawings. The frame is provided between its ends with an eye or loop 5, into which is linked an eye 6 of a rod or link 7, which extends to the opposite face of the plate or body 1 to a spring-actuated loop 8. The loop, which is approximately rectangular, is provided at its outer end with a bend 9, into which the link 7 is engaged, and the said rectangular loop is provided with an integral transversely-disposed spring-coil 10, and it forms a spring for actuating the hinged frame. The spring-coil is disposed transversely of the loop, and it extends across the same from one side thereof, and the other side is provided with an integral pintle 11, extending through the spring-coil and terminating in an arm 12, which engages the adjacent side of the loop of the spring. The pintle is arranged within suitable bearings 13, which may consist of staples, but which may be constructed in any other desired manner.

The spring-loop is adapted to be swung from the position illustrated in Fig. 2 to that shown in Fig. 1 to set the trap, and it is held in such position by a rod 14, hinged at the outer edge of the plate or body and adapted to be swung over the loop and to be engaged by a bait-receiving trigger 15, as clearly illustrated in Fig. 1 of the drawings. The hinged end of the rod is provided with an eye which is linked into a perforation of the plate or body, and the other end of the rod is provided with a notch or groove 16 to receive the trigger. The trigger, which is provided at its upper end with a hook for engaging the rod, may be constructed of wire or any other suitable material, and it is provided between its ends with an eye 17, through which passes a pintle 18, and the lower end of the trigger has a hook 19. The hook 19 of the trigger is adapted to receive a suitable bait for attracting the animals to be captured, and when the trap is set the frame 3 is swung away from the plate or body, and its hinged or rear end is arranged adjacent to a tree, log, or other support, so that the bait cannot be approached from that point. An animal in attempting to obtain the bait passes over the hinged frame between the same and the body, and when the trigger is pulled the trap is sprung and the hinged frame is drawn close to the plate and is locked in such position by the spring and the link, thereby effectually preventing an animal extricating itself from the trap. When the hinged frame is nearly closed, the link-rod will be drawn over the edge of the plate and fulcrumed thereon, and it will form a lock to prevent an animal from forcing the hinged frame away from the plate. The groove or notch of the rod may be made any depth or it may be entirely dispensed with to provide a trap of the desired sensitiveness.

It will be seen that the trap is exceedingly simple and inexpensive in construction, that it possesses great strength and durability, and that the hinged frame and the spring are located at opposite sides of the plate or body and are adapted to form a lock to prevent a captured animal from escaping. Furthermore, it will be clear that the plate or body is adapted to form a cover or shield for the bait to protect the latter from the weather.

What I claim is—

1. A trap comprising a plate or body, a hingedly-mounted member arranged at one face of the plate or body, a spring hingedly mounted at the opposite face of the plate or body, a link-rod hinged to the said hinged member and to the spring and disposed at an angle to the former and arranged to be fulcrumed on the edge of the plate or body, whereby the parts will form a lock when the trap is sprung to hold the hinged member against outward movement, and means for holding the trap set, substantially as described.

2. A trap comprising a plate or body, a hingedly-mounted frame located at one face of the plate or body, a spring-actuated loop hinged to the plate or body at the opposite face thereof, said frame and loop extending in opposite directions when the trap is sprung, a link-rod hinged to the frame and to the loop and connecting the said parts and arranged to be fulcrumed on the edge of the plate or body, whereby the lever forms a lock for holding the hinged member against outward movement, and means for holding the trap set, substantially as described.

3. A trap comprising a plate, a hingedly-mounted frame located at the lower face of the plate or body, a spring located at the opposite face of the plate, a link hinged to the frame and to the spring and arranged to be fulcrumed on the plate to form a locking-lever, and means for holding the trap set, said means being provided with a bait-receiving trigger depending from the plate at a point between the edges thereof whereby the latter is adapted to form a cover to protect the bait, substantially as described.

4. A trap comprising a plate, a hingedly-mounted member arranged at one face of the plate, a spring-actuated loop located at the opposite face of the plate, a link-rod connecting the hingedly-mounted member and the loop and arranged to be fulcrumed on the edge of the plate, whereby the loop will be locked against outward movement, a rod hinged to the plate and arranged to hold the spring-actuated loop when the trap is set, and a bait-receiving trigger extending through the plate and engaging the rod and having a bait-receiving portion located beneath the plate, whereby the latter is adapted to form a shield or cover, substantially as described.

In testimony that I claim the foregoing as my own I have hereto affixed my signature in the presence of two witnesses.

JOSEPH EMBERY MANLOVE.

Witnesses:
J. S. NUMMAKER,
S. H. ROBINSON.